MAGNETIC AMPLIFIERS WITH BIASED RECTIFIERS

Filed June 11, 1954 7 Sheets-Sheet 1

Inventors
Raymond E. Morgan
Hugh M. Ogle
by Howard D. Schlansker
Their Attorney

MAGNETIC AMPLIFIERS WITH BIASED RECTIFIERS

Filed June 11, 1954 7 Sheets-Sheet 2

Inventors
Raymond E. Morgan
Hugh M. Ogle
by Howard S. Schlanker
Their Attorney

July 28, 1959 R. E. MORGAN ET AL 2,897,293
MAGNETIC AMPLIFIERS WITH BIASED RECTIFIERS
Filed June 11, 1954 7 Sheets-Sheet 3

Inventors
Raymond E. Morgan
Hugh M. Ogle
by Howard D. Schlansker
Their Attorney

Inventors
Raymond E. Morgan
Hugh M. Ogle
by Howard D. Schlanaker
Their Attorney

Inventors
Raymond E. Morgan
Hugh M. Ogle
by Howard D. Schlenker
Their Attorney

MAGNETIC AMPLIFIERS WITH BIASED RECTIFIERS

Filed June 11, 1954 7 Sheets-Sheet 6

Inventors
Raymond E. Morgan
Hugh M. Ogle
by Howard S. Schlansker
Their Attorney

July 28, 1959 R. E. MORGAN ET AL 2,897,293

MAGNETIC AMPLIFIERS WITH BIASED RECTIFIERS

Filed June 11, 1954 7 Sheets-Sheet 7

Inventors
Raymond E. Morgan
Hugh M. Ogle
by Howard D. Schlenker
Their Attorney 2,897,293

MAGNETIC AMPLIFIERS WITH BIASED RECTIFIERS

Raymond E. Morgan and Hugh M. Ogle, Schenectady, N.Y., assignors to General Electric Company, a corporation of New York Application June 11, 1954, Serial No. 436,068

15 Claims. (Cl. 179—171)

Figure 1A:
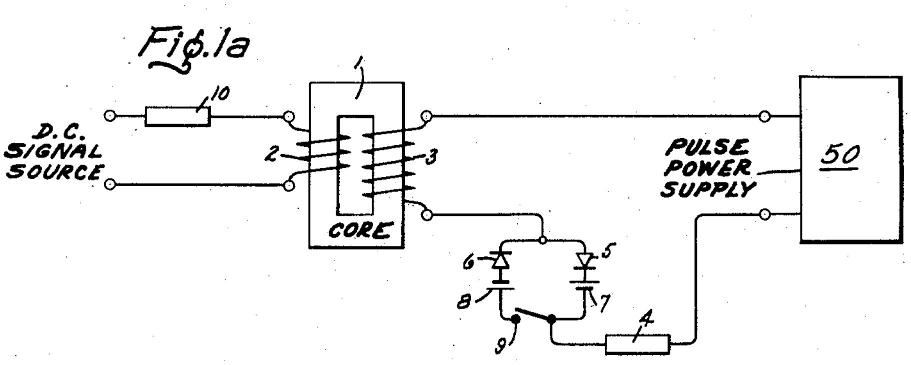

Our invention relates to magnetic amplifiers. More particularly, it relates to magnetic amplifiers of low volt-ampere ratings which are characterized by small size, high gain, and high speed of response.

Conventional magnetic amplifiers such as those of the self-saturating type rated above about 0.1 volt-ampere operate very well from 60 cycle sinusoidal power supplies. However, below this rating efficient operation from conventional sine wave power supplies is impractical. As the rating decreases, the core size becomes very small providing a small flux path cross section. In addition, the practical limit of two or three mils for wire sizes which are capable of being wound from a practical viewpoint establishes the maximum number of turns in the power windings. From the foregoing it follows that the voltage rating of the saturable reactor included in such magnetic amplifier must decrease with a decrease in the volt-ampere rating and is commonly expressed in terms of the average sinusoidal volts applied across the power winding in order to drive the core between positive and negative saturation conditions. In addition below a rating of about 0.1 volt-ampere a magnetic amplifier of the self-saturating type would be operating below the knee of the rectifier forward characteristic since the voltage characteristics of the rectifiers in the power circuit do not change with reduction in size. As a practical matter the lower voltage rating of the amplifier is found in such a case to be of the same order of magnitude as the apparent fixed electromotive force of the rectifiers. The term "apparent fixed electromotive force" is used herein to mean the voltage magnitude occurring at the extrapolation upon the zero current axis of the linear saturation slope of the forward voltage vs. current characteristic of the rectifier.

It will be seen, then, that the conventional sine wave magnetic amplifier becomes impractical at low volt-ampere ratings. Since conventional rectifiers have a forward characteristic knee at about 0.75 volt, this means that the reactor of the sine wave magnetic amplifier must be rated considerably above 0.75 average sinusoidal volts if the sine wave magnetic amplifier is to have any practical utility.

A possible solution to the problem of operating at low volt-ampere ratings is by the use of a pulse power supply. In such case for a given reactor the volt-time integral of one-half of a cycle is replaced by the volt-time integral of a pulse whose maximum voltage is higher than the peak of the normally used sinusoidal wave and whose duration is less than that of the sine wave half cycle. In using the pulse voltage, the knee of the rectifier forward characteristic is obscured. A reactor rated at 0.018 average sinusoidal volts, generally useless for sine wave magnetic amplifiers, would be rated, when using a pulse power supply, at 15 volts peak for a pulse of 10 microseconds duration. However, since the magnetic circuit producing the power pulse has a low efficiency of about 10 percent, magnetic amplifiers using such pulse power supplies are generally limited to low power ratings where high losses can be tolerated. At higher ratings the more efficient sinusoidal power supplies are preferably used for reasons of economy and heat dissipation among others.

An object of this invention is to provide magnetic amplifiers which operate efficiently at low volt-ampere ratings.

A further object of this invention is to provide such magnetic amplifiers which are characterized by small size, high gain, and high speed of response.

Still another object of this invention is to provide a magnetic amplifier with a low voltage rating which offers a push-pull mode of operation with but one saturable core structure.

Figures 1B, 1C:
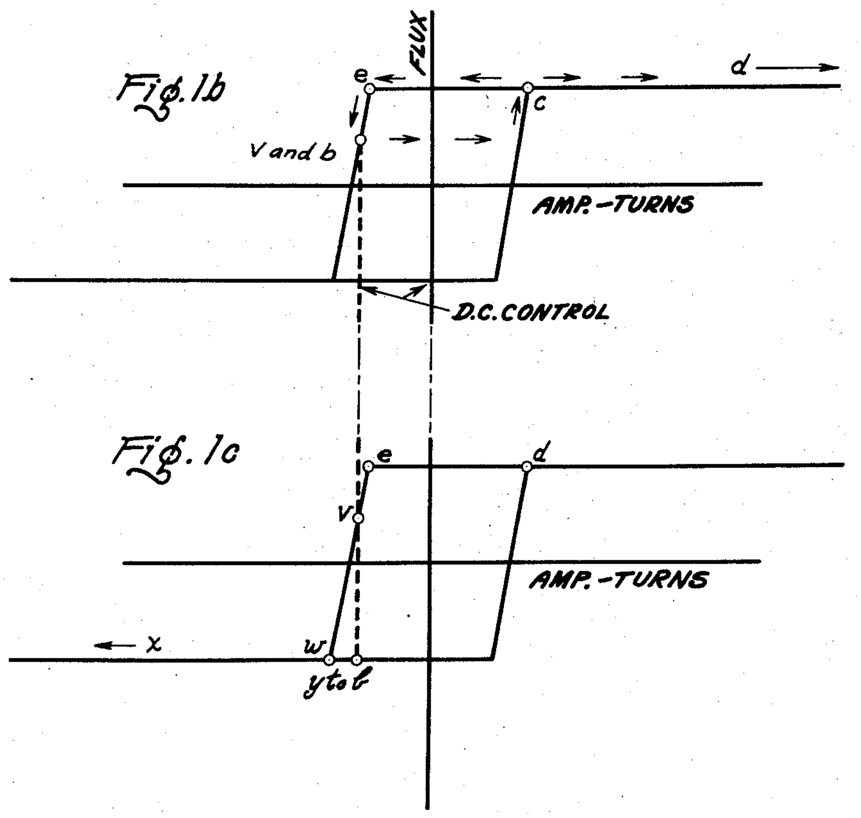

Other objects will become apparent and our invention better understood from a consideration of the following description and the drawing in which:

Fig. 1*a* shows a magnetic amplifier of our invention and Figs. 1*b* and 1*c* show hysteresis loops for different modes of operation of the magnetic amplifier of Fig. 1*a*.

Figure 2A:
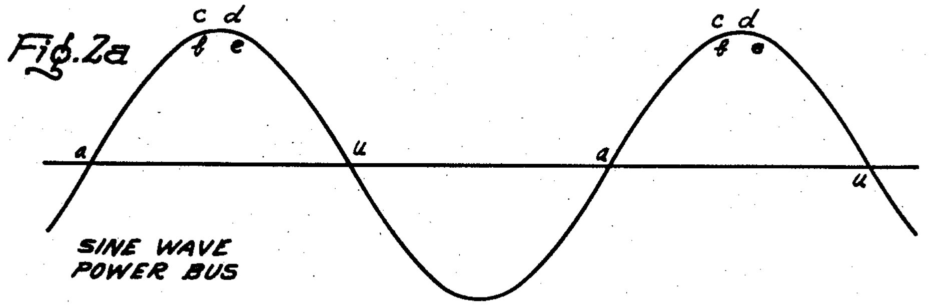
Figure 2B:
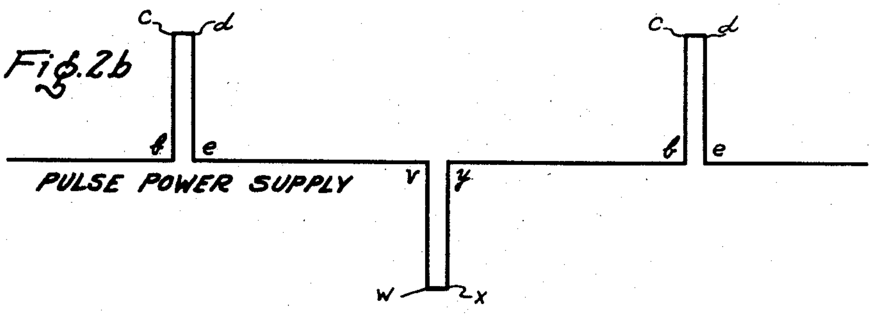
Figure 2C:
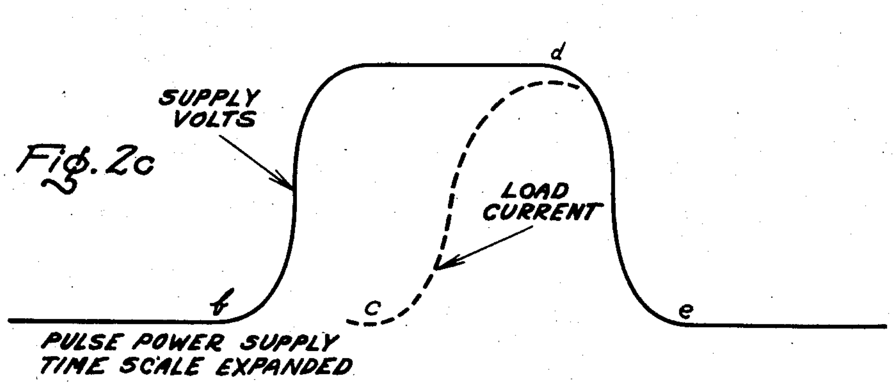

Fig. 2*a* shows the power bus sine wave used. Fig. 2*b* shows the pulse power supply shape and Fig. 2*c* shows the shape of the power supply pulse with the time scale expanded.

Figure 3A:
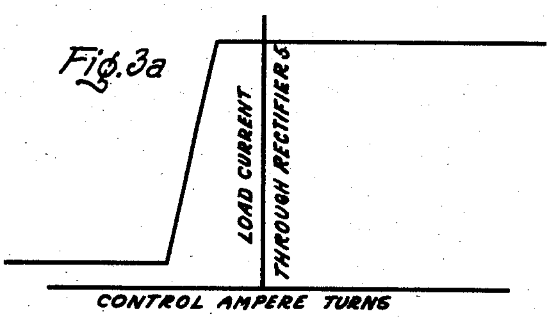
Figure 3B:
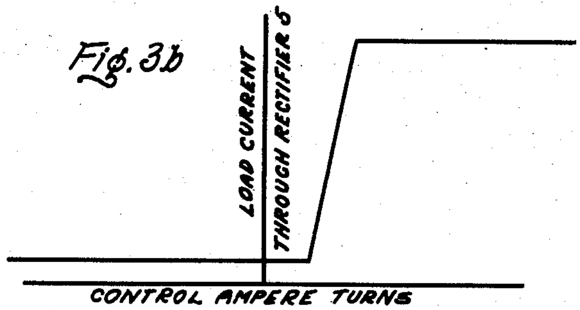
Figure 4A:
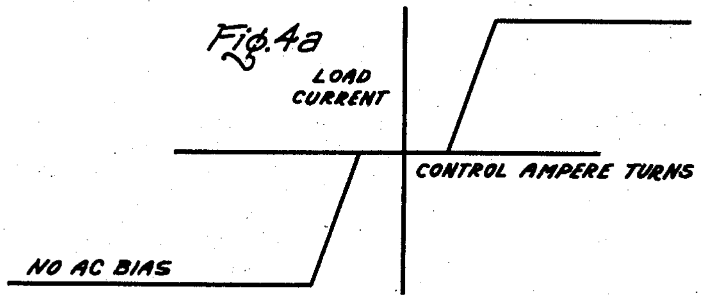
Figure 4B:
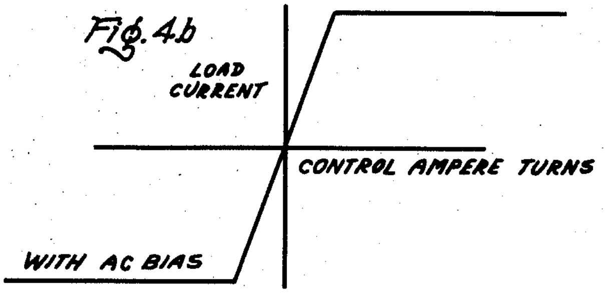
Figures 5, 6:
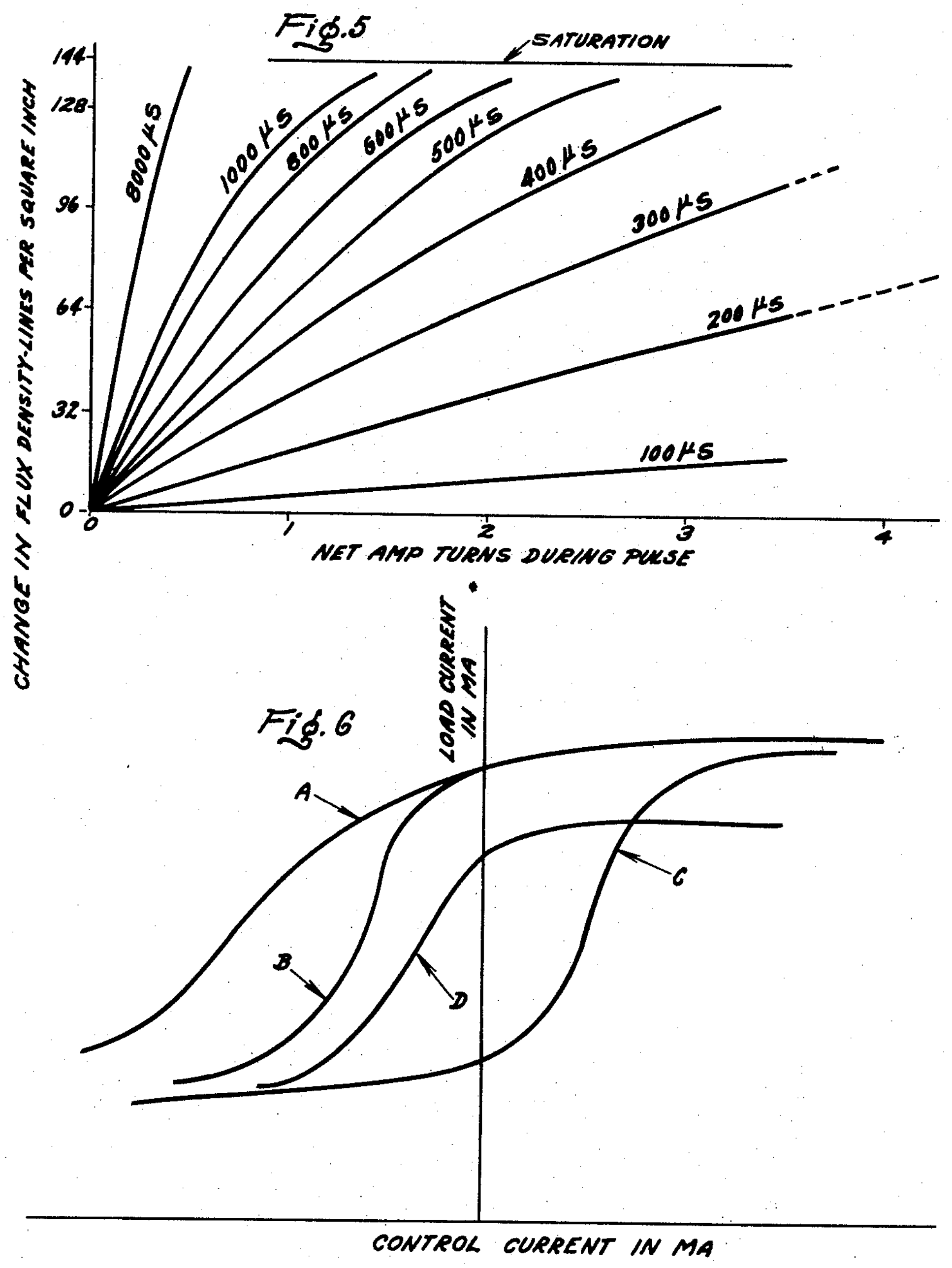
Figure 7A:
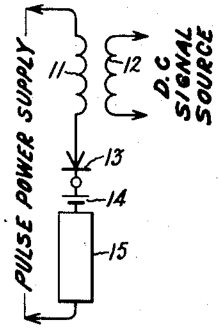
Figure 7B:
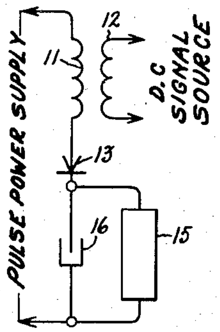
Figure 7C:
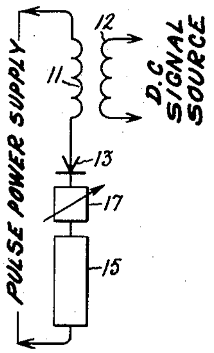
Figure 8:
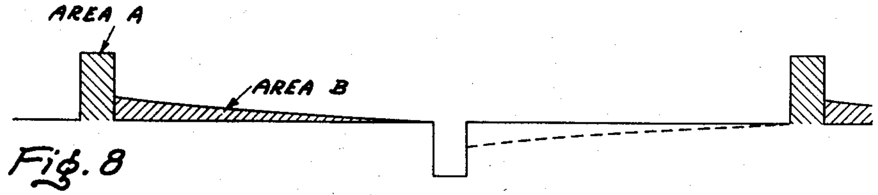
Figure 9:
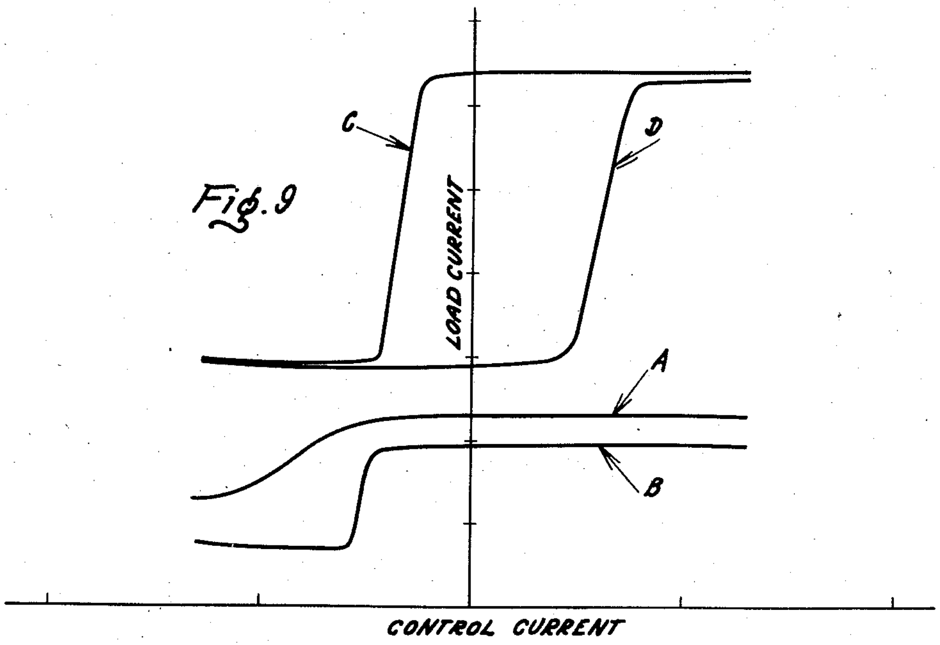
Figure 10A:
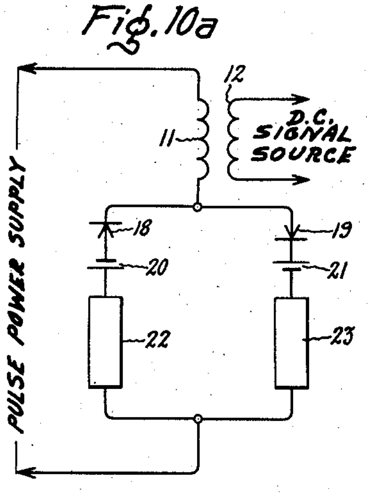
Figure 10B:
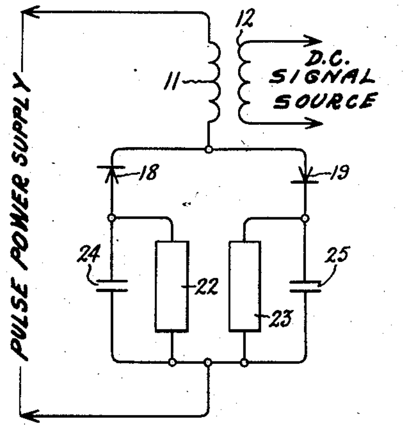
Figure 11A:
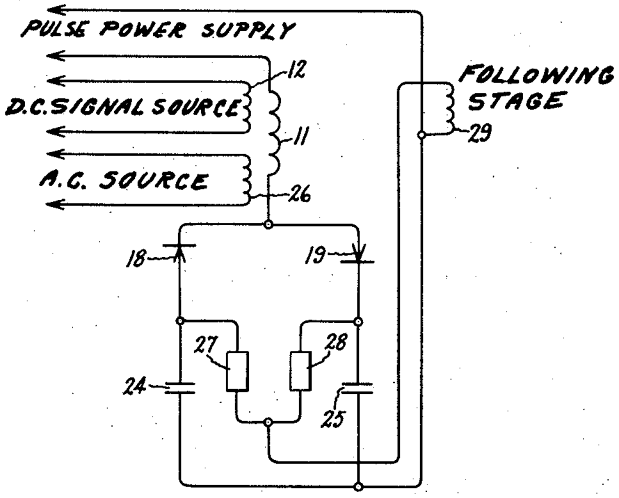
Figure 12:
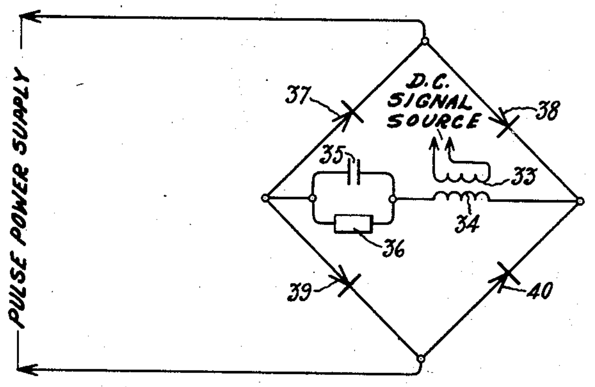
Figure 13:
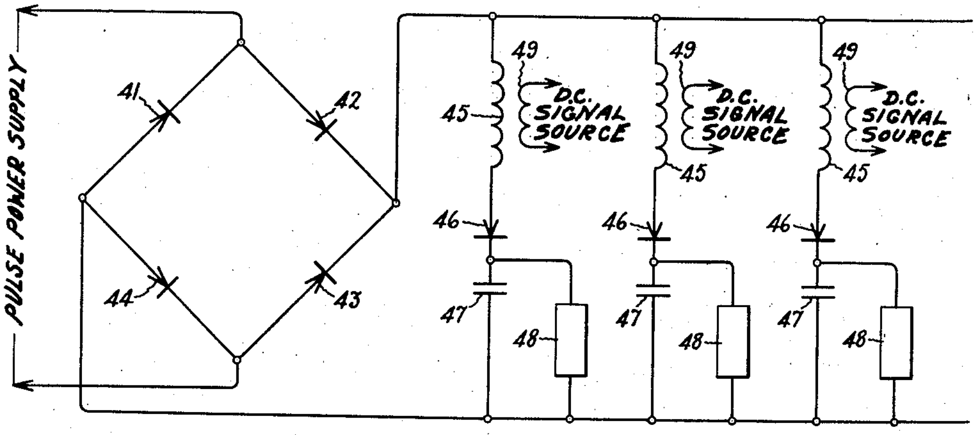

Figs. 3*a* and 3*b* show the control current versus load current characteristic of the circuit of Fig. 1*a* during two modes of operation. Figs. 4*a* and 4*b* show the push-pull transfer characteristic of two types of operation of the circuit of Fig. 1*a*. Fig. 5 shows flux change versus net ampere turns during the pulse for operating power pulses of various lengths. Fig. 6 is a plot of control current versus load current for magnetic amplifiers with and without biased rectifiers. Figs. 7*a* through 7*c* show simplified circuits relating to our invention. Fig. 8 shows the relationship between the power pulse and capacitor discharge for a capacitor-biased magnetic amplifier. Fig. 9 is a plot of control current versus load current for various magnetic amplifiers. Figs. 10*a* and 10*b* show magnetic amplifiers of our invention in push-pull arrangement as do Figs. 11*a* and 11*b*. Fig. 12 shows our invention as applied to a full wave magnetic amplifier and Fig. 13 illustrates our invention in a full wave magnetic amplifier having a number of stages of amplification.

Briefly stated, our invention relates to magnetic amplifiers having one or more rectifiers in the power circuit.

In accordance with our invention the power supply is, instead of the customary sinusoidal or half wave rectified D.C., a power supply producing periodic pulses the duration of which pulses is considerably shorter than the cyclical period between successive power pulses. Normally the core of a magnetic amplifier resets to the control flux level during the negative signal from the power supply. However, we insert a small source of electromotive force in series with each rectifier in such manner as to oppose normal load current flow. A small voltage is thus supplied across the rectifier allowing the core to reset to the control flux level in the period between pulses and before the negative pulse occurs. The source of electromotive force may take any desired form. Typically it may be an electric cell or battery, a charged capacitor, the back electromotive force from a generator, a rectifier output voltage, a semiconductor characteristic, or a non-linear impedance.

The advantages of our invention are many. It permits the use of very small reactors of less than five percent in volume and weight of conventional magnetic amplifiers.

Our biased rectifier magnetic amplifier also enables the use of a single core for push-pull operation.

By allowing resetting of the core between power pulses, controlled power output is obtained during both positive and negative pulses.

As compared with conventional magnetic amplifiers our invention has better drift stability and economy of materials.

By permitting the reactor core to reset between pulses, the time for such resetting is lengthened and greater gain realized.

Referring to Fig. 1*a* there is shown an embodiment of our invention in which the magnetic amplifier is operated by a D.C. signal. Magnetic core 1 has wound around one leg thereof control or signal winding 2 connected to a D.C. signal source which is variable for control purposes. Power or output winding 3 on the other leg of core 1 is connected to a pulse power supply 50 whose output pulses are short compared to the interval between pulses. Such pulse power supplies are not per se the subject of this invention but may be of any type well-known to those skilled in the art. This power supply is energized in turn by a power bus not shown. In series with output winding 3 and the pulse power supply 50 is impedance load 4 and the biased rectifier circuit comprising first and second rectifiers 5 and 6 which are arranged in parallel one with the other. Sources of electromotive force 7 and 8 are in series respectively with rectifiers 5 and 6 and polarized as shown to oppose the normal flow of load or output current in the system. Switch 9 is provided to permit inclusion of rectifier 5 in the circuit alone or in conjunction with rectifier 6. An impedance 10 may be used in the control circuit to prevent loading of the power circuit by transformer coupling action.

With switch 9 open the circuit of Fig. 1*a* operates as a half wave self-saturating magnetic amplifier or amplistat. Fig. 1*b* shows the hysteresis loop of this arrangement with a D.C. negative signal applied to control winding 2 while Fig. 2*a* shows the related power bus sine wave cycle. Fig. 2*b* shows the pulse phase in relation to the power bus sine wave cycle and Fig. 2*c* shows the power pulse with the time scale expanded. All lower case alphabetical designations in Fig. 1 and Fig. 2 correspond to the same points on the time scale. (The hysteresis loops shown are those resulting from normal operation of the amplifier and are in idealized form as having four straight sides.) For example, time relation point *c* in Fig. 1*b* is at the time the core 1 saturates and voltage appears across load 4. Point *d* is near the end of the power pulse and at the peak of the load current and point *e* is at the end of the power pulse. Other time relation points corespond to various times occurring in the sine wave power bus cycle. Points *a* through *e* correspond to the positive parts of the cycle whereas points *v* through *y* correspond to the negative half cycle.

With switch 9 open point *b* occurs on the back side of the hysteresis at a point such as that shown in Fig. 1*b* which is determined by the D.C. control signal to winding 2; the power pulse not yet having begun. During the first part of the power pulse, the flux rises to positive saturation at point *c*. By the time point *e* which represents the end of the positive power pulse is reached the flux has returned to the upper left hand corner of the hysteresis loop as shown. This return is instantaneous since there is little or no flux change between points *d* and *e*.

Between points *e* and *v* as will be seen from perusal of the drawing no voltage is produced by the pulse power supply, the only voltage in the cycle during this period being from battery 7 which is of such polarity that the rectifier normally prevents current flow from the battery. During the period between points *e* and *v* only those voltages may occur across the output winding 3 which are not greater than the battery voltage. The induced voltage due to the flux change in the output coil between points *e* and *v* is in such direction as to produce a current flow through rectifier 5 in the absence of battery 7, or in other words, if the rectifier were not reverse biased by a source of electromotive force. If the induced voltage across the output or power coil caused by the flux dropping from point *d* to point *v* is greater than that of battery 7, current flows through the rectifier 5 greatly reducing any further rate of change of flux. Hence, the flux will change at such proper rate as will provide a voltage across output coil 3 to approximately equal the battery voltage until the flux has reached point *v* where it remains until the initiation of a new pulse at point *b*. The flux adjustment, of course, occurs prior to point *b* but may take place anytime between points *e* and *b*. It follows that while the voltage of battery 7 may, if desired, approach the amplitude of the power pulse, it need be only sufficient to permit the flux to change from positive saturation to negative saturation. In other words, the battery voltage should be equal to or greater than the average sinusoidal voltage rating of the reactor. That is to say that the voltage of the source of electromotive force represented by battery 7 must be great enough to permit the flux in the core to reset to a control flux level. To accomplish this the volt-time integral of the rectifier reverse bias voltage over the period between pulses must be at least equal to the volt-time integral of the supply voltage pulse itself. Therefore, if the length of the applied pulse is relatively long with respect to the cycle, the magnitude of the voltage required to permit the core to reset itself will approach the magnitude of the applied voltage and as a consequence the useful output voltage will be very small. For example, if the power supply 50 produced sinusoidal voltages instead of pulses in a full wave single-sided magnetic amplifier otherwise identical to the one shown in Fig. 1*a* with the switch 9 closed, then the reset voltage or rectifier reverse biasing voltage would of necessity be slightly greater than the average value of the sine wave voltage applied. Thus it will be seen that only a small portion of the applied voltage would represent useful output in such a case. As another example, if a pulse length of 5 percent of one-half of one cycle is used, then the battery voltage need only be about 5 percent of the power supply peak voltage.

It is obvious that with switch 9 open in the circuit of Fig. 1*a*, and with battery 7 omitted the circuit would operate similar to an ordinary self-saturating magnetic amplifier. However, in this case the flux would have to reset during the negative pulse or between points *v* and *y* instead of between points *e* and *v* with a resultant reduction in figure of merit or gain.

Referring to Fig. 1*c* there is shown the hysteresis loop for the circuit of Fig. 1*a* with switch 9 closed. At the end of the positive power pulse the flux, as in Fig. 1*b*, is at point *e* at the upper left hand corner of the loop. Having biased rectifier 5, the flux will settle to point *v* between the time represented by *e* and *v* on the time scale of Fig. 2*b*. In other words, the core will reset during this period. The flux is driven between points *v* and *w* to negative saturation and into full negative saturation at point *x*. The flux difference between points *v* and *w* is determined by the D.C. signal similarly to the flux change between point *b* and *c*.

After point *y* the flux settles to a magnitude determined by the D.C. signal which is still at negative saturation and the flux remains at this magnitude until point *b* is reached from which magnitude the flux is driven to positive saturation as represented by point *d*.

With the reactor designed to exactly match the voltage of the power pulse at point *d*, the flux will move to saturation but not into complete saturation. At the end of the positive power pulse the flux returns to the upper left hand corner of the hysteresis loop point *e*. The above operation provides little or no output during the positive power pulse and about one-quarter of the maximum output during the negative power pulse. With the signal increased in a negative sense, the output during the negative power pulse increases. The reverse is true when the signal is reversed. For example, the output would be one-quarter of the maximum output during the positive power pulse and negligible during the negative power pulse.

Fig. 3*a* shows the control current versus load current characteristic of the circuit of Fig. 1*a* with switch 9 open. With switch 9 closed and plotting the load current only through the rectifier 5 the characteristic shown in Fig. 3*b* is obtained. Fig. 3*b* is similar to Fig. 3*a*, if the latter had been biased.

Plotting the D.C. current or voltage across the load of the circuit of Fig. 1*a* with the switch closed versus signal or control ampere turns produces the push-pull transfer characteristic shown in Fig. 4*a*. With an A.-C. bias applied to core 1 through the use of an A.C. bias winding not shown in the drawings, a characteristic similar to that shown in Fig. 4*b* is obtained when the flat spot or low gain region near zero signal of 4*a* is removed.

The amplification of the biased rectifier pulse magnetic amplifier increases as the reset time increases. Shown in Fig. 5 is a family of curves showing flux change versus net ampere turns during the pulse for power pulses of various lengths. These curves correspond to the control characteristic of a pulse operated magnetic amplifier of the self-saturating type, the flux reset time being indicated on the curves. It will be noted that for the particular core used in the magnetic amplifier concerned, about twice the signal ampere turns are required to give the same flux at 300 microseconds compared to 500 microseconds reset time.

The biased rectifier circuit permits resetting of the core between the power pulses used to operate the magnetic amplifier. In other words, the flux settles to an amount controlled by the D.C. signal during the period between pulses rather than during the pulse period itself.

Again referring to Fig. 1*a* in which case switch 9 is open to form a conventional half-wave, self-saturating magnetic amplifier circuit, assume that battery 7 is not in series with rectifier 5. Under these assumptions at point *b* just prior to the positive power pulse, the flux is settling at a point determined by the control current. As the power pulse is applied, the flux is driven to positive saturation at point *c* and into complete saturation at point *d*. At the end of the power pulse at point *e* the flux returns to the upper left hand corner of the hysteresis loop. Here again the lower case letters apply to like points in time on Figures 1*b*, 1*c*, and 2*a* through 2*c*. During the time between points *e* and *v* no voltage is applied from the power supply. Here the desired direction of flux change is such as to induce a voltage in the power or output coil 3 of such direction as to cause current flow through rectifier 5. Hence, unless the reactor is extremely small (having then a negligible inductive effect) there will be little or no flux change during the period of time between point *e* and point *v*. Between the time points *v* and *y* during the negative power pulse back voltage tends to occur across rectifier 5 due to the negative voltage from the pulse power supply, thus permitting voltage to build up in the power or output coil 3 and the flux to change to the point determined by the D.C. control or signal. During the period between points *v* and *b* little or no flux change can occur. Thus the amplifier flux must reset during the time of the negative power pulse.

Now let us consider the case with the cell or battery 7 in series with rectifier 5 in which case rectifier 5 is a biased rectifier. In this situation the operation during the positive power pulse is as above. At point *e* at the end of the positive power pulse the flux returns to the upper left hand corner of the hysteresis loop, point *e*. However, unlike the above case where the rectifier was not biased, there is now a voltage from the battery tending to produce a back voltage across the rectifier sufficient to permit a voltage to build up across the power or output coil 3 equal to that of the battery 7. This permits the flux to change. Therefore, during the period between point *e* and point *v* the flux settles to the point determined by the signal. Inasmuch as in this case there is much more time (frequently 10, 20, or possibly 100 times as much time) for the flux to reset, less control current is required to reset the core.

Fig. 6 illustrates the contrast between the above two conditions, that is, with an unbiased rectifier and with a biased rectifier. Curve A is a plot of a control current versus load current for a half wave pulse magnetic amplifier of the self-saturating type having no biased rectifier. Curve B shows the same characteristic for a half-wave pulse operated magnetic amplifier of the self-saturating type with a biased rectifier. Curve C is the characteristic for a single half cycle of a push-pull pulse operated magnetic amplifier having a biased rectifier while D shows the characteristic for a half-wave magnetic amplifier of the self-saturating type operated from a sine wave power supply. It will be seen that even though the gain of the pulse operated magnetic amplifier of the self-saturated type as shown in curve A is less than when using a sine wave power supply as shown in curve D, a very appreciable gain over both is realized when a pulse power supply with biased rectifier is used as shown in curve B.

As pointed out above, a capacitor usually with an impedance in parallel therewith may be used in lieu of the cell or battery mentioned above. A capacitive load is usually practical only in small magnetic amplifiers of the self-saturating type. In larger magnetic amplifiers of this type operating from a sine wave the size of the capacitor becomes quite large. However, in pulse operated magnetic amplifiers the short operating pulse makes it practical to use small capacitors in lieu of batteries or cells and the like to bias the rectifier.

Shown in Figs. 7*a* through 7*c* are half-wave pulse amplistats illustrating the present invention. In Fig. 7*a* there is shown output or power coil 11 which, in accordance with this invention, is energized by a pulse power supply. Also shown is control or signal winding 12 energized by a D.C. signal source which may have in circuit therewith an impedance, not shown, to prevent transformer coupling action between the control circuit and the power circuit. In series with output coil 11 is rectifier 13 which is biased by cell or battery 14. Also in the output circuit is impedance or load 15. The circuit of Fig. 7*a* is similar to that of Fig. 1*a* with switch 9 open. The battery and resistor of Fig. 7*a* can be replaced by capacitor 16 and impedance 15 of Fig. 7*b*, which in all other respects is similar to Fig. 7*a*. In the circuit of 7*b* impedance 15 is also used as the load, although of course a separate load may also be employed. In Fig. 7*b* the capacitor 16 charges during the conducting period of the power pulse and holds back voltage flow across the rectifier long enough after the power pulse has ceased to permit the core to reset. In this way the capacitor voltage performs the function of cell 14 of Fig. 7*a*. Capacitor 16 is further discharged through impedance or load 15 to prevent the capacitor voltage from becoming too great in relation to the pulse power supply voltage. It will be obvious, of course, that the capacitor can be discharged by impedances such as a resistance, inductance, or saturating inductance.

For the capacitor 16 to permit the core to reset after the power pulse, the voltage time integral of the curve of capacitor discharge voltage versus time before the succeeding power pulse must equal the voltage time integral of the curve of the power supply pulse voltage versus time. This will become apparent by reference to Fig. 8 which shows the power pulse and capacitor discharge interrelationship. Area A is the peak value of the power pulse voltage multiplied by the time duration of the pulse. Area B is equal to the average voltage of the capacitor discharge before the succeeding power pulse multiplied by the time between power pulses. To permit the capacitor to reset the core after the power pulse, area B of Fig. 8 must at least equal area A. It is desirable to select the capacitor and impedance to give a voltage time integral slightly greater than that of the power pulse in order to insure complete reset before the next power pulse and account for variations and circuit elements.

The discharge time constant of the impedance capacitance combination in Fig. 7*b* may be as short as the pulse length because the peak pulse voltage is the maximum voltage to which the capacitor can be charged. However, as may be deduced from Fig. 5 and Fig. 8 it is desirable that the time constant be as long as possible to obtain a greater gain. A reasonable minimum value is 90° of the sine wave power supply (which may be 60 cycles per second, 400 cycles per second, 1000 cycles per second, etc.). The time constant of the capacitor impedance combination may also be very long approaching infinity and acting like a constant electric cell voltage. However, the capacitor, unlike a battery, helps to determine the time constant of the load. A reasonable maximum value for the time constant therefore is usually one cycle of the sine wave power bus.

For optimum operating conditions of the circuit of Fig. 7*a* the load impedance will be of such magnitude that about 50 percent of the pulse supply voltage will be impressed across the load, and the circuit characteristic will resemble curve B of Fig. 9. If the battery is removed and a reasonable value of capacitance placed across the load only about 10 percent of the pulse power supply voltage will appear across the capacitor in the charged condition. The impedance of the circuit of Fig. 7*b* is lower than that of the circuit in Fig. 7*a*, and approximately three times the load current is obtained when using a capacitor as shown in curve C of Fig. 9. This gives a resulting increase in gain. This increase in gain is more apparent when the characteristic for the capacitive circuit, curve C of Fig. 9, is contrasted with curves A and B which correspond generally to the curves A and B of Fig. 6.

Shown in Fig. 7*c* is a circuit similar to that of Figs. 7*a* and 7*b* except that the rectifier 13 has in series therewith a non-linear impedance. A non-linear impedance is one having the characteristic that its impedance varies in accordance with a non-linear function of the current which flows through it. When confronted with substantial overvoltages, such impedance decreases permitting large amounts of current to flow through the load. As the overvoltage subsides, the impedance increases with the disappearance of the overvoltage until substantially no current or negligible leakage current will pass. It will thus be seen that such a non-linear impedance may act substantially in the role of a capacitor such as capacitor 16 of Fig. 7*b*. Such non-linear impedance materials are well-known being typified by mixtures of silicon carbide and carbon, and silicon carbide mixed with other conducting material such as molybdenum and the like, or to mixtures of silicon carbide and galena or silicon carbide and clay glass and inverse poled silicon rectifiers and other materials. Some non-linear resistance materials are described in Patent 1,822,742, McEachron, assigned to the same assignee as this invention.

Fig. 10*a* illustrates a push-pull magnetic amplifier of the present invention and is similar to Fig. 7*a* except that the push-pull feature has been added. The magnetic amplifier of Fig. 10*a* has a power or output coil 11 which is energized by pulse power supply and a control coil 12 energized from a D.C. signal source. Rectifiers 18 and 19 are arranged in parallel one with the other in push-pull arrangement and in series with power or output coil 11. In series with rectifier 18 is cell 20 and impedance 22, while in series with rectifier 19 we have cell 21 and impedance 23, the impedances 22 and 23 acting also in this case as a load.

In Fig. 10*b* cells 20 and 21 have been replaced by capacitors 24 and 25 in parallel respectively with impedances 22 and 23. In the circuits of Figs. 10*a* and 10*b* load current flows not only through one load impedance during the positive power pulse but also through the other load impedance during the negative power pulse.

Comparison of curves C and D respectively of Fig. 9 reveal that the shape of the characteristic of Fig. 7*b* is changed very little when the circuit is modified to the push-pull circuit of Fig. 10*b*. The loads of the circuits of Figs. 10*a* and 10*b* may be, of course, instead of impedances as shown, two signal windings of a following push-pull stage. The circuit of Fig. 11*a* which is also a push-pull magnetic amplifier of the type described in this invention is the same as that of Fig. 10*b* except that part of the load impedance is replaced with a signal winding for a following or succeeding stage. Here we have power output coil 11 which is energized by a pulse power supply and signal or control coil 12 energized from a D.C. signal source. A.C. bias is applied to the core by bias coil 26 energized from an A.C. source. Rectifiers 18 and 19 are in parallel with one another and in series with output coil 11. In series with rectifier 18 is capacitor 24 and in series with rectifier 19 is capacitor 25. In parallel with the capacitor 24 is a series circuit which consists of an impedance 27 and the signal or control winding 29 for a following stage. An impedance 28 is also connected in series with the signal or control winding 29 for a following magnetic amplifier stage and the series combination is connected in parallel with the capacitor 25. In the circuit of Fig. 11*a* the current diverted from the load is reduced to a negligible value. After the current passes through impedance 28 nearly all of the current also goes through signal winding 29 since the resistance of the signal winding 29 is small compared with that of resistance 27. Impedances 27 and 28 along with the inductance of control winding 29 provide the desired time constant for the signal winding of the following stage. Variation in coil resistance has negligible effect since the coil resistance is small compared to resistors 27 and 28.

Figure 11B:
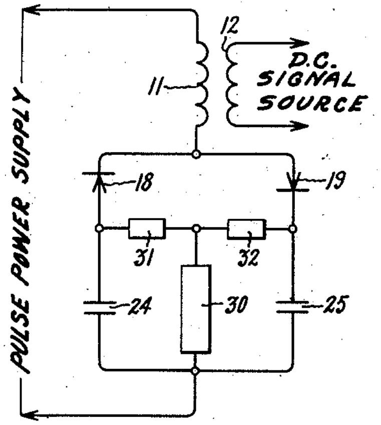

Fig. 11*b* shows another push-pull single core magnetic amplifier of this invention which is derived from the circuit of Fig. 10*b*. Here we have control winding 12 which is energized by a D.C. signal source and output winding 11 which is in series with a pulse power supply. Rectifiers 18 and 19 are in parallel with each other and in series with output coil 11. In series with rectifiers 18 and 19 are capacitors 24 and 25 respectively. In parallel with capacitor 24 is impedance 31 and load impedance 30. Impedance 32, and load impedance 30 are in parallel with capacitor 25 as shown.

In certain instances a full-wave single-sided magnetic amplifier embodying our invention may be desired. An example of such a magnetic amplifier is shown in Fig. 12. Here is shown a full-wave rectifier bridge comprising rectifiers 37, 38, 39, and 40 which is energized by pulse power supply. Connected across the output terminals of the bridge is output winding 34 having an operational connection therewith. Control winding 33 is energized by a D.C. signal source. In series with output coil 34 is capacitor 35 having in parallel therewith impedance 36. The characteristic of this magnetic amplifier is very similar to that of curve C in Fig. 9 except that each corresponding value of control current has twice the load current.

In the same manner as shown in Fig. 12 several magnetic amplifier stages may be separately driven by a rectifier bridge as shown in Fig. 13. Shown in Fig. 13 is our invention as applied to such a full wave magnetic amplifier system having a number of stages which may be as many as desired.

The full wave rectifier bridge is energized by a pulse power supply and comprises rectifiers 41, 42, 43, and 44. Connected across the rectifier bridge in parallel one with the other are a plurality of biased rectifier magnetic amplifiers. Each magnetic amplifier comprises a control winding 49, an output winding 45, having in series therewith rectifier 46 which later is biased by capacitor 47 having in parallel therewith impedance 48.

The circuits described herein are illustrative of thousands of circuits which may be formed utilizing biased rectifier magnetic amplifiers as described. It will be realized, of course, that where reference is made herein to elements of circuits such as a control winding, bias winding, output or power winding, or a rectifier and the like, such elements may also be made up of a plurality or combination of sub-elements to, in effect, provide control winding means, output winding means, rectifier means and the like.

The use of biased rectifier magnetic amplifiers has many advantages. For example, it drastically reduces the minimum size for push-pull magnetic amplifier stages. The reactor size is reduced from about 1 cubic inch to less than 0.003 cubic inch for some applications. Usually a push-pull rector requires four cores whereas biased rectifier magnetic amplifiers as described herein can provide a push-pull output with one core and one power winding. The biased rectifier magnetic amplifier of this invention can also provide a full wave output with one core and one output winding.

While we have described herein certain embodiments of our invention, it will be realized that the biased rectifiers described herein may be applied by those skilled in the art to many other magnetic amplifier circuits. We desire to protect by the claims appended hereto all embodiments of our invention which do not depart from the spirit and scope thereof.

What we believe is new and desire to secure by Letters Patent of the United States is:

1. A pulse power operated magnetic amplifier circuit comprising a saturable reactor having a control winding, a power winding, and a saturable magnetic core linking said windings; a pulse power supply connected in series with said power winding and producing periodic power pulses having a pulse duration considerably less than the period between successive pulses; and output circuit means including a rectifier and a source of unidirectional electromotive force poled in opposition to one another and connected in series circuit relation with each other and with said power winding and said pulse power supply, the average potential of said source of electromotive force being at least equal to the average potential of said periodic power pulses, whereby the magnetic flux in said core is reestablished at a control flux level in the intervals between successive power pulses supplied by said pulse power supply.

2. The magnetic amplifier circuit of claim 1 wherein said source of electromotive force comprises an electromotive cell.

3. The magnetic amplifier circuit of claim 1 wherein said source of electromotive force comprises a non-linear impedance.

4. The magnetic amplifier circuit of claim 1 wherein said source of electromotive force comprises a capacitor.

5. A pulse power operated magnetic amplifier circuit comprising a saturable reactor having a control winding for connection to a source of control signals, a power winding, and a saturable magnetic core linking said windings; a source of periodic power pulses having a pulse duration considerably less than the period between successive pulses; and an output circuit including a rectifier and a source of electromotive force connected in series and poled in opposition to one another, said power winding, said pulse power source, and said output circuit being connected in series circuit relationship, and the average potential of said source of electromotive force being at least equal to the average potential of said source of power pulses.

6. A pulse power operated magnetic amplifier circuit comprising a saturable reactor having a control winding for connection to a source of control signals, a power winding, and a saturable magnetic core linking said windings; a source of periodic power pulses having a pulse duration considerably less than the period between successive pulses; and an output circuit including a rectifier and a source of electromotive force connected in series and poled in opposition to one another, said power winding, said power pulse source, and said output circuit being connected in series circuit relationship, and the volt-time integral of said electromotive force over a period between pulses being at least equal to the volt-time integral of a single one of said pulses.

7. A pulse power operated magnetic amplifier circuit comprising a saturable reactor having a control winding for connection to a source of control signals, a power winding, and a saturable magnetic core linking said windings; a source of periodic power pulses having a pulse duration considerably less than the period between successive pulses; and an output circuit including a rectifier and an impedance connected in series circuit relationship with each other and a capacitor connected in parallel with said impedance to provide a reverse bias on said rectifier, said power winding, said power pulse source, and said output circuit being connected in series circuit relationship with each other, the values of said parallel-connected capacitor and impedance being selected to provide an average potential across said capacitor at least equal to the average potential of said periodic power pulses.

8. A pulse power operated magnetic amplifier circuit comprising a saturable reactor having a control winding for connection to a source of control signals, a power winding, and a saturable magnetic core linking said windings; a source of periodic power pulses having a pulse duration considerably less than the period between successive pulses; and an output circuit including a rectifier and an impedance connected in series circuit relationship with each other and a capacitor connected in parallel with said impedance to provide a reverse bias on said rectifier, said power winding, said power pulse source, and said output circuit being connected in series circuit relationship with each other, the values of said parallel-connected capacitor and impedance being selected to provide a reverse bias potential across said capacitor the volt-time integral of which over a period between successive power pulses is at least equal to the volt-time integral of a single one of said power pulses.

9. A pulse operated magnetic amplifier circuit comprising a source of power pulses having a pulse duration considerably less than the period between successive pulses; a saturable reactor having a power winding connected in series with said power pulse source, a control winding for connection to a source of control signals, and a saturable magnetic core linking said windings; and output circuit means connected to receive said power pulses and including a rectifier and a source of electromotive force poled in opposition to one another and connected in series circuit relation with each other and with said power winding and power pulse source, said source of electromotive force providing voltages the instantaneous values of which are considerably less than the amplitude of the voltage provided by said power pulses and the average values of which are at least equal to the average voltage of said source of power pulses.

10. A pulse operated magnetic amplifier circuit comprising a source of power pulses having a pulse duration considerably less than the period between successive pulses; a saturable reactor having a power winding connected in series with said source of power pulses, a control winding for connection to a source of control signals, and a saturable magnetic core linking said windings; and output circuit means connected to receive said power pulses and including a rectifier and a source of electromotive force poled in opposition to one another and connected in series circuit relation with each other and with said power winding and said power pulse source, said source of electromotive force providing voltages the instantaneous values of which are considerably less than the amplitude of the voltage provided by said power pulses, the volt-time integral of said electromotive force over a period between successive pulses being at least equal to the volt-time integral of one of said pulses.

11. A pulse operated magnetic amplifier circuit comprising a source of power pulses having a pulse duration considerably less than the period between successive pulses; a saturable reactor having control and power windings and a saturable magnetic core linking said windings; output circuit means connected to receive said power pulses and including a rectifier and an impedance connected in series circuit relation with each other and with said power winding and said source of power pulses, and a capacitor connected in parallel with said impedance to provide an electromotive force biasing said rectifier in a reverse direction during the intervals between said power pulses, the average voltage across said capacitor being at least equal to the average voltage of said source of power pulses but considerably less than the peak amplitude of said power pulses.

12. A push-pull operated magnetic amplifier circuit comprising a single saturable reactor having an output winding, a control winding for connection to a source of control signals, and a saturable magnetic core linking said windings; a first rectifier and a first source of electromotive force poled in opposition to one another and connected in series circuit relation with each other and with said output winding; a second rectifier and a second source of electromotive force poled in opposition to each other and connected in parallel circuit relation with said first rectifier and said first source of electromotive force, said first and second rectifiers being oppositely poled relatively to said output winding; and a source of periodic power pulses of alternately reversing polarity having a pulse duration which is short compared to the interval between pulses, said power pulse source being connected in series with said output winding and said parallel-connected rectifiers, and said first and second sources of electromotive force producing an average reverse potential bias on each of said rectifiers at least equal to the average voltage of said power pulse source but considerably less than the peak potential of said pulses.

13. A push-pull operated magnetic amplifier circuit comprising a single saturable reactor having an output winding, a control-winding for connection to a source of control signals, and a saturable magnetic core linking said windings; full wave reverse-biased rectifier means connected in series with said output winding, said means including a pair of oppositely poled parallel-connected rectifiers each having a source of unidirectional electromotive force connected in series opposition therewith; and a source of periodic power pulses of alternately reversing polarity having a pulse duration which is short compared to the interval between pulses, said power pulse source being connected in series with said output winding and said full wave reverse-biased rectifier means, said sources of unidirectional electromotive force producing an average reverse potential bias on each of said rectifiers at least equal to the average potential of said power pulse source but considerably less than the peak potential of said pulses.

14. The magnetic amplifier circuit of claim 13 wherein said sources of unidirectional electromotive force in series with each rectifier respectively comprise an impedance and a capacitor connected in parallel circuit relation with each other.

15. A magnetic amplifier circuit comprising means for producing periodic unidirectional potential pulses each having a pulse duration considerably less than the period between successive pulses; a saturable reactor having an output winding, a control winding for connection to a source of control signals, and a saturable magnetic core linking said windings; reverse-biased rectifier means including a rectifier and a source of unidirectional electromotive force connected in series opposition therewith, said pulse producing means, said output winding, and said reverse biased rectifier means being connected in series to constitute an output circuit; and impedance means connected to receive currents passed by said output circuit, the average potential of said source of unidirectional electromotive force being at least equal to the average potential of said pulse producing means but considerably less than the peak potential of said power pulses, whereby the flux in said core is reestablished at a control flux level in the intervals between successive unidirectional potential pulses supplied by said pulse producing means.

References Cited in the file of this patent

UNITED STATES PATENTS

| | | |
|---|---|---|
| 2,164,383 | Burton | July 4, 1939 |
| 2,519,513 | Thompson | Aug. 22, 1950 |
| 2,554,203 | Morgan | May 22, 1951 |
| 2,571,708 | Graves | Oct. 16, 1951 |
| 2,683,853 | Logan | July 13, 1954 |
| 2,733,306 | Bedford | Jan. 31, 1956 |
| 2,762,967 | Stateman | Sept. 11, 1956 |
| 2,770,737 | Ramey | Nov. 13, 1956 |
| 2,794,165 | Van Scoyoc | May 28, 1957 |

OTHER REFERENCES

Attura: Electronics, June 1953, pages 161–163.

Mamon: Electrical Manufacturing, vol. 52, No. 2, August 1953, pages 136–139. (Copy in Scientific Library.)